May 1, 1934.  A. G. FORSYTH  1,956,896
MEANS FOR STARTING INTERNAL COMBUSTION ENGINES
Filed April 13, 1933
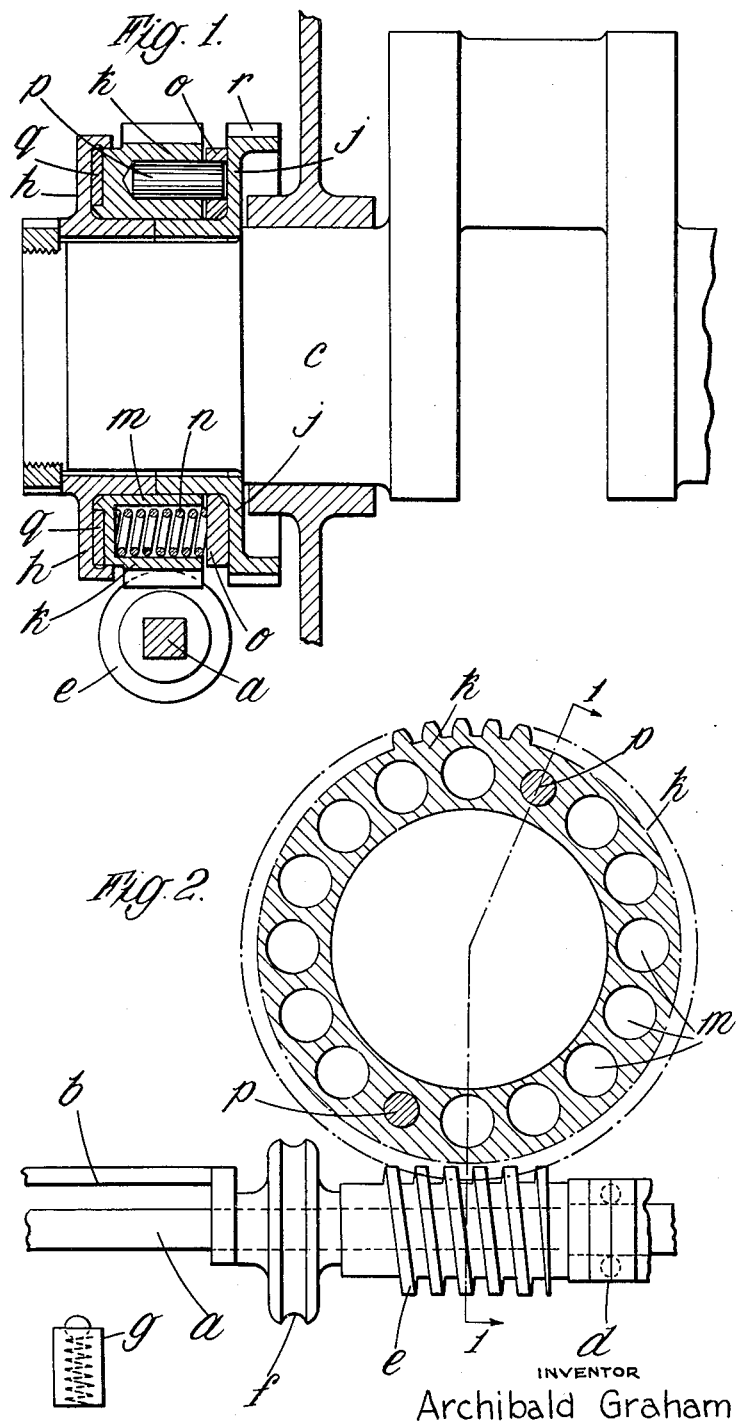
INVENTOR
Archibald Graham Forsyth Patented May 1, 1934

1,956,896

UNITED STATES PATENT OFFICE 1,956,896

MEANS FOR STARTING INTERNAL COMBUSTION ENGINES

Archibald Graham Forsyth, Cheam, England, assignor to The Fairey Aviation Company Limited, Hayes, England Application April 13, 1933, Serial No. 666,059
In Great Britain June 8, 1932

4 Claims. (Cl. 123—185)

This invention relates to means for starting internal combustion engines, and has for its object a very simple and light device for preventing damage to the engine in the event of a backfire when starting.

To this end a friction clutch is interposed between the end of the crankshaft of the engine, and the means by which said shaft is rotated for starting purposes.

Preferably the improved starting device comprises a worm slidable axially on, but constrained to rotate with, the shaft of a starting handle or the like, a worm wheel rotatably mounted on the engine shaft, a thrust bearing or the like against which said worm may abut when it is in mesh with the worm wheel, and a friction clutch normally coupling the worm wheel with the crankshaft, but adapted to slip in the event of a backfire.

The arrangement is such that when the worm is slidden axially on the shaft of the starting handle or the like until it touches the worm wheel, rotation of said shaft will cause thread of said worm to engage the teeth of the worm wheel, and draw said worm further along said shaft until it is properly situated when it will abut against the thrust bearing or the like. Continued rotation of said shaft will then cause the worm wheel to be rotated, and the crankshaft of the engine will be driven through the friction clutch. When the engine starts the worm wheel acts as a driving pinion, and the worm as a driven rack i. e. the worm is slidden along its shaft, and out of engagement with the worm wheel. If, however, a backfire were to occur, the rack and pinion action of the worm and worm wheel would be in the opposite direction driving the worm against its thrust bearing or the like, and serious damage would result, but for the fact that the friction clutch permits the worm wheel to remain stationary, whilst the crank shaft of the engine turns backwards.

In the accompanying drawing Figure 1 is a sectional side elevation of one form of the improved starting gear on the line 1—1, Figure 2, and Figure 2 is a diagrammatic sectional front elevation thereof.

In accordance with the form of the invention illustrated the shaft $a$ of a starting handle $b$ is disposed beneath and transversely of the end of the crankshaft $c$ of an engine, and has a bearing in a bearing block (not shown), the front of which is arranged as a thrust bearing $d$.

On a squared part of the starting shaft $a$ is disposed a worm $e$ which is slidable axially thereon, but which rotates therewith, the forward end of said worm being grooved peripherally as at $f$ so that when it is slidden forwardly on said shaft $a$ it may be engaged by a spring influenced nose $g$ and held resiliently against movement longitudinally of said starting shaft $a$.

Fast on the end of the crankshaft $c$ of the engine are two rings $h$ $j$, substantially of L-section, which together constitute a ring of channel section in which is disposed an annular worm wheel $k$ rotatable relatively thereto and, therefore, to the crankshaft $c$. This worm wheel $k$ is formed with a circular series of recesses $m$ which extend from one lateral face of, and partially through the width of said worm wheel $k$, the axes of said recesses lying parallel with that of the worm wheel $k$ and in these recesses $m$ are disposed a series of coiled springs $n$ which abut against the bottoms of the respective recesses $m$ and against an annular friction plate $o$ disposed between the worm wheel $k$ and the adjacent side $j$ of the channel section rings $h$ $j$. This friction plate $o$ is constrained to rotate as one with the worm wheel $k$ by dowel pins $p$ $p$ fitted into both, and at the side of the worm wheel $k$ remote from said friction plate $o$ is provided a second annular friction plate $q$ to coact with the adjacent side $h$ of the channel section rings $h$ $j$.

The starting handle $b$ is formed to receive the squared part of the starting shaft $a$ and when it is engaged therewith it pushes back the worm $e$, (the spring influenced nose $g$ yielding) until the worm thread touches the teeth of the worm wheel $k$, rotation of the starting handle $b$ then causes the worm $e$ to engage said teeth, and draw itself along the starting shaft $a$ until it abuts against the thrust bearing $d$, whereafter the rotation of the starting handle $b$ turns the worm wheel $k$. The loading of the springs $n$ of the friction clutch is such that the crankshaft $c$ of the engine is turned, and when the engine starts the worm wheel $k$ functions as a pinion, and the worm $e$ as a rack, with the result that the worm $e$ is projected forwards along the starting shaft $a$ until its peripheral groove $f$ is engaged by the spring influenced nose $g$ by which said worm $e$ is held in position clear of the worm wheel $k$. If, however, instead of the engine starting, a backfire were to occur, the worm $e$ being hard up against the thrust bearing $d$ could not move, hence, the worm wheel $k$ is held stationary, but the channelled rings $h$ $j$ being coupled with said worm wheel $k$ only by the frictional effect of the friction plates $o$ $q$, is permitted to turn backwards, thus damage to the parts or to the engine is obviated. The connection by means of the dowel pins *p p* between the worm wheel *k* and the friction plate *o* against which the springs *n* abut prevents said springs from being buckled when torque is transmitted, without interfering with the expansive action of said springs to produce the frictional effect.

If desired, the flange limb of either or each of the two L-section rings *h j* which constitute the channelled ring may be formed as a gear wheel as at *r* for the transmission of power from the engine to ancillary parts.

I claim:—

1. Means for starting an internal combustion engine having a crank-shaft, comprising a starting handle shaft, a worm slidable on, but rotatable with, said shaft, a channel section ring secured on the engine crank shaft, a worm wheel adapted to be engaged by said worm and mounted in said channel section ring, and rotatable and slidable thereon, two annular friction plates rotatably mounted in said channel section ring, one on each side of said worm wheel, spring means on said worm-wheel exerting pressure on said friction plates, and creating friction between the sides of said channel section ring and said plates, and a thrust bearing with which said worm engages when it is in mesh with said worm-wheel.

2. Means for starting an internal combustion engine having a crank-shaft, comprising a starting handle shaft, a worm slidable on but rotatable with, said shaft, a channel section ring secured on the engine crank shaft, a worm wheel adapted to be engaged by said worm and mounted in said channel section ring and rotatable and slidable thereon, two annular friction plates rotatably mounted in said channel section ring, one on each side of said worm wheel, springs disposed in recesses in one side of said worm wheel and abutting on one side of the adjacent friction plate, the other friction plate being connected with said worm-wheel and being rotatable as one therewith, friction being created between the sides of said channel section ring and plates, and a thrust bearing with which said worm engages when it is in mesh with said worm wheel.

3. Means for starting an internal combustion engine as claimed in claim 1, in which the channel section ring is constituted by two rings, each substantially of L-section, the flange limb of one of said rings being formed as a gear wheel.

4. Means for starting an internal combustion engine as claimed in claim 2, in which the channel section ring is constituted by two rings, each substantially of L-section, the flange limb of one of said rings being formed as a gear wheel.

ARCHIBALD GRAHAM FORSYTH.